United States Patent
Hayashi

(10) Patent No.: US 12,394,850 B2
(45) Date of Patent: Aug. 19, 2025

(54) BATTERY MOUNTING CASE

(71) Applicant: HONDA MOTOR CO., LTD., Tokyo (JP)

(72) Inventor: Yutaka Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 17/954,440

(22) Filed: Sep. 28, 2022

(65) Prior Publication Data

US 2024/0106051 A1 Mar. 28, 2024

(51) Int. Cl.
*H01M 50/244* (2021.01)
*H01M 50/262* (2021.01)
*H01M 50/271* (2021.01)
*H01M 50/528* (2021.01)

(52) U.S. Cl.
CPC ....... *H01M 50/244* (2021.01); *H01M 50/262* (2021.01); *H01M 50/271* (2021.01); *H01M 50/528* (2021.01); *H01M 2220/20* (2013.01)

(58) Field of Classification Search
CPC .. H01M 50/20; H01M 50/244; H01M 50/271; H01M 2220/20; H01M 6/50; H01M 6/5072; H01M 6/52; H01M 10/42
See application file for complete search history.

(56) References Cited

U.S. PATENT DOCUMENTS

| | | | |
|---|---|---|---|
| 2012/0018237 A1* | 1/2012 | Kovach | H01M 50/249 180/68.5 |
| 2021/0300167 A1* | 9/2021 | Yamada | A01D 34/78 |
| 2021/0313647 A1 | 10/2021 | Itai et al. | |

FOREIGN PATENT DOCUMENTS

| | | | |
|---|---|---|---|
| CN | 103140392 | * | 6/2013 |
| WO | 2020/017324 | | 1/2020 |

OTHER PUBLICATIONS

CN103140392 English translation. Yazawa et al. China. Jun. 5, 2013. (Year: 2013).*

* cited by examiner

*Primary Examiner* — Christopher P Domone
(74) *Attorney, Agent, or Firm* — Amin, Turocy & Watson, LLP

(57) ABSTRACT

A battery mounting case includes a case main body, a connector, a temporary placing table, and an exchange preparation mechanism. The case main body has a battery storage part that stores a battery, and a battery mounting port that opens to an upper side of the battery storage part. The connector is conductively connected to the battery stored in the case main body. The temporary placing table is movable between a battery storage position in the battery storage part and a battery extracting position outside the battery storage part. The exchange preparation mechanism moves the connector to a detachment position where the connector is separated from the battery and moves the temporary placing table to a position where the battery is able to be supported before moving the temporary placing table from the battery storage position to the battery extracting position.

10 Claims, 6 Drawing Sheets

BATTERY MOUNTING CASE

BACKGROUND OF THE INVENTION

Field of the Invention

The present invention relates to a battery mounting case that stores a battery therein.

Background Art

In electrically powered equipment such as an electric ship, an electric vehicle, or the like, a portable chargeable battery (battery pack) may be used. In this case, in the electrically powered equipment, a battery mounting case for mounting a battery is installed. The battery mounting case includes a battery storage part that stores the battery, and a connector that is able to be connected to the battery in the battery storage part (for example, see PCT International Publication No. 2020/017324).

In the battery mounting case disclosed in Patent Document 1, the battery storage part and the connector are provided in a case main body, and a battery mounting port is formed on a front surface of the case main body. An opening/closing lid that is able to be opened and closed forward and downward while pivoting on a pivot shaft on a lower end side is attached to the front surface of the case main body. A lid-side guide section having an upper surface side on which a battery can be placed and slidably moved in a state in which the opening/closing lid opens upon exchange of the battery is provided on a surface of the opening/closing lid facing the inside of the case main body.

The battery mounting case can facilitate attaching/detaching work of a battery by a worker by supporting a load of the battery, which is a heavy object, using a lid-side guide section of the opening/closing lid upon exchange of the battery.

SUMMARY OF THE INVENTION

In the battery mounting case disclosed in Patent Document 1, upon exchange of the battery, it is necessary to temporarily extract a used battery from the battery storage part and temporarily place it on a floor surface or the like, and then store a charged battery in the battery storage part. However, if the extracted used battery is placed on a placing surface such as a nearby floor surface and there is water on the placing surface, the water may adhere to a connector connecting portion of the battery.

In addition, when the used battery is extracted from the battery storage part, a worker may temporarily place a charged battery transported from another place on a placing surface such as a nearby floor surface or the like. Even in this case, when there is water on the placing surface, the water may adhere to the connector connecting portion of the battery.

Accordingly, the present invention is directed to providing a battery mounting case with which exchange work of a battery can be performed without temporarily placing a used battery or a charged battery on a nearby floor surface or the like.

A battery mounting case according to an aspect of the present invention includes: a case main body having a battery storage part that stores a battery and a battery mounting port that opens to an upper side of the battery storage part; a connector that is conductively connected to the battery stored in the case main body; a temporary placing table that is movable between a battery storage position in the battery storage part and a battery extracting position outside the battery storage part; and an exchange preparation mechanism that moves the connector to a detachment position where the connector is separated from the battery and moves the temporary placing table to a position where the battery is able to be supported before moving the temporary placing table from the battery storage position to the battery extracting position.

In the configuration described above, when a used battery in the battery storage part is exchanged with another charged battery, the connector is moved to the detachment position by operating the exchange preparation mechanism, and the battery is supported by the temporary placing table in the battery storage part. After that, the temporary placing table is moved from the battery storage position to the battery extracting position. Accordingly, the used battery is moved to the battery extracting position outside the battery storage part, and a space that can store another battery is formed in the battery storage part. After that, a worker stores the charged battery in the battery storage part through the battery mounting port, and then the used battery on the temporary placing table can be extracted.

The exchange preparation mechanism may include an operation part that is operated by a worker; and an interlocking mechanism that moves the connector to the detachment position and moves the temporary placing table to a position where the battery is able to be supported in conjunction with an operation of the operation part in one direction.

In this case, when a worker operates the operation part in one direction, the connector is moved to the detachment position in conjunction with the operation, and the temporary placing table is moved to the position where the battery can be supported. For this reason, when this configuration is employed, extraction preparation of the battery can be completed by a worker with a simple operation.

The battery mounting case may further include an upward biasing portion that biases the connector upward; a displacement restricting portion that restricts upward displacement of the connector; and a restriction release portion that releases displacement restriction of the connector by the displacement restricting portion when the temporary placing table is moved from the battery storage position to the battery extracting position.

In this case, upon exchange of the battery, in a state in which an operation part is operated in one direction, when the temporary placing table on which the used battery is placed is moved from the battery storage position to the battery extracting position, displacement restriction of the connector by the displacement restricting portion is released by the restriction release portion. Thereby, the connector is biased by the upward biasing portion to protrude upward. After that, when the charged battery is placed on the connector from the battery mounting port, the charged battery receives a biasing force of the upward biasing portion to be held at a predetermined height. When the temporary placing table is operated to move from the battery extracting position toward the battery storage position from this state, the temporary placing table is smoothly inserted below the charged battery.

The battery mounting case may further include a restart function part that restarts displacement restriction of the connector by the displacement restricting portion when the temporary placing table is moved from the battery extracting position toward the battery storage position.

In this case, when the temporary placing table is operated to move from the battery extracting position toward the battery storage position, displacement restriction of the connector by the displacement restricting portion is restarted in a state in which the temporary placing table is inserted below the charged battery. As a result, constant attitudes or heights of the connector and the battery supported by the connector are maintained.

The interlocking mechanism may move the connector to a connecting position to the battery and move the temporary placing table to a position where the table is separated from the battery in conjunction with the operation of the operation part in another direction when the operation part is operated in the other direction after the restriction release portion restarts displacement restriction of the connector by the displacement restricting portion.

In this case, in a state in which the temporary placing table has returned to the battery storage position, when the operation part is operated in the other direction, the interlocking mechanism moves the connector to the connecting position to connect the connector to the charged battery, and the temporary placing table is separated from the battery. Accordingly, when this configuration is employed, connection of the connector to the battery and returning of the temporary placing table to the initial position can be completed by the operation of the operation part in the other direction.

The operation part may be constituted of a lid member that opens and closes the battery mounting port, and the one direction may be a direction in which the lid member opens.

In this case, when the lid member is opened at the time of exchange of the battery, the connector is moved to the detachment position in conjunction with the opening operation of the lid member, and the temporary placing table is moved to a position where the battery can be supported. Accordingly, when the present configuration is employed, the exchange work of the battery can be efficiently performed.

The temporary placing table may be constituted of a pair of rail-shaped members that extend in a direction in which the battery storage position and the battery extracting position are connected, the pair of rail-shaped members may be disposed to be separated in a direction crossing the extension direction of the rail-shaped members, and the connector may be disposed between the pair of rail-shaped members when seen in a direction along the extension direction of the rail-shaped members.

In this case, the pair of rail-shaped members and the connector, which constitute the temporary placing table, can be compactly disposed in the limited space in the battery storage part. In addition, the pair of rail-shaped members can support the battery with good balance at both side positions with the connector connecting portion of the battery sandwiched therebetween.

The interlocking mechanism may include: a lever portion that has a pair of engagement pieces extending in an opposite direction from a pivoting center and pivots in conjunction with the operation part; a connector-side link mechanism that is linked to one of the engagement pieces and moves the connector to the detachment position by pivoting of the lever portion in one direction; and a temporary placing-table-side link mechanism that is linked to another of the engagement pieces and moves the temporary placing table to a position where the battery is able to be supported by pivoting of the lever portion in one direction.

In this case, when the operation part is operated in one direction, the lever portion is pivoted in one direction in conjunction with the operation part. At this time, the connector and the temporary placing table are operated in an opposite direction in conjunction with the pivoting operation of the lever portion by the connector-side link mechanism and the temporary placing-table-side link mechanism. Accordingly, when the present configuration is employed, the operation of the connector to the detachment position and the moving operation of the temporary placing table to the battery support position can be smoothly performed with a simple configuration.

Effects of the Invention

In the battery mounting case according to the aspect of the present invention, upon exchange of the battery, the connector can be moved to the detachment position by the exchange preparation mechanism, and the temporary placing table can be moved to the position where the battery can be supported. Then, in the battery mounting case according to the aspect of the present invention, the charged battery can be stored in the battery storage part through the battery mounting port, and then the used battery can be extracted from the temporary placing table by moving the temporary placing table to the battery extracting position from this state.

Accordingly, when the battery mounting case according to the aspect of the present invention is employed, the exchange work of the battery can be performed without temporarily placing the used battery or the charged battery on a nearby floor surface or the like.

EMBODIMENTS

Hereinafter, an embodiment of the present invention will be described with reference to the accompanying drawings.
<Configuration of Embodiment>

Figure 1:
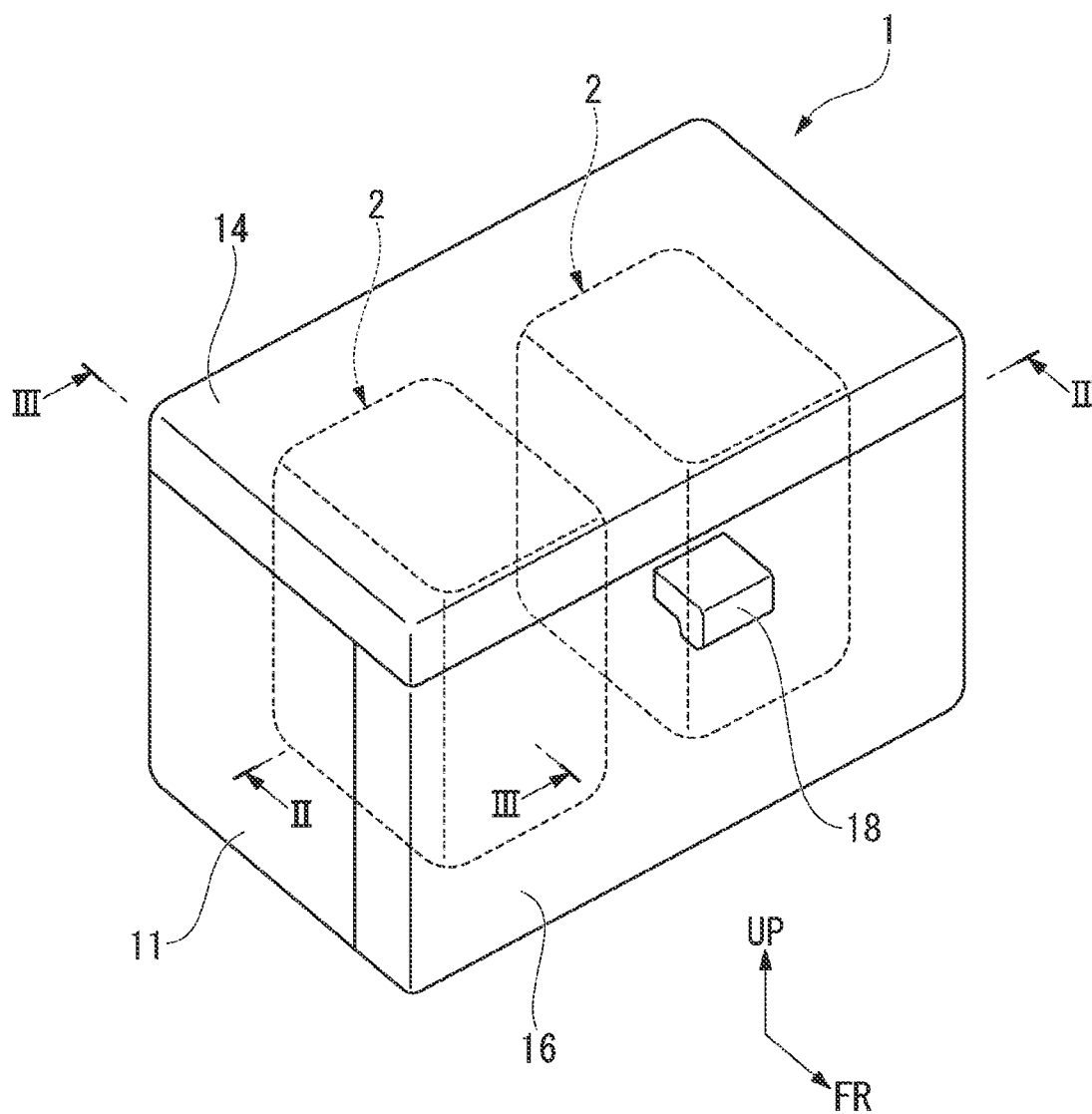
FIG. 1 is a perspective view of a battery mounting case of an embodiment.
Figure 2:
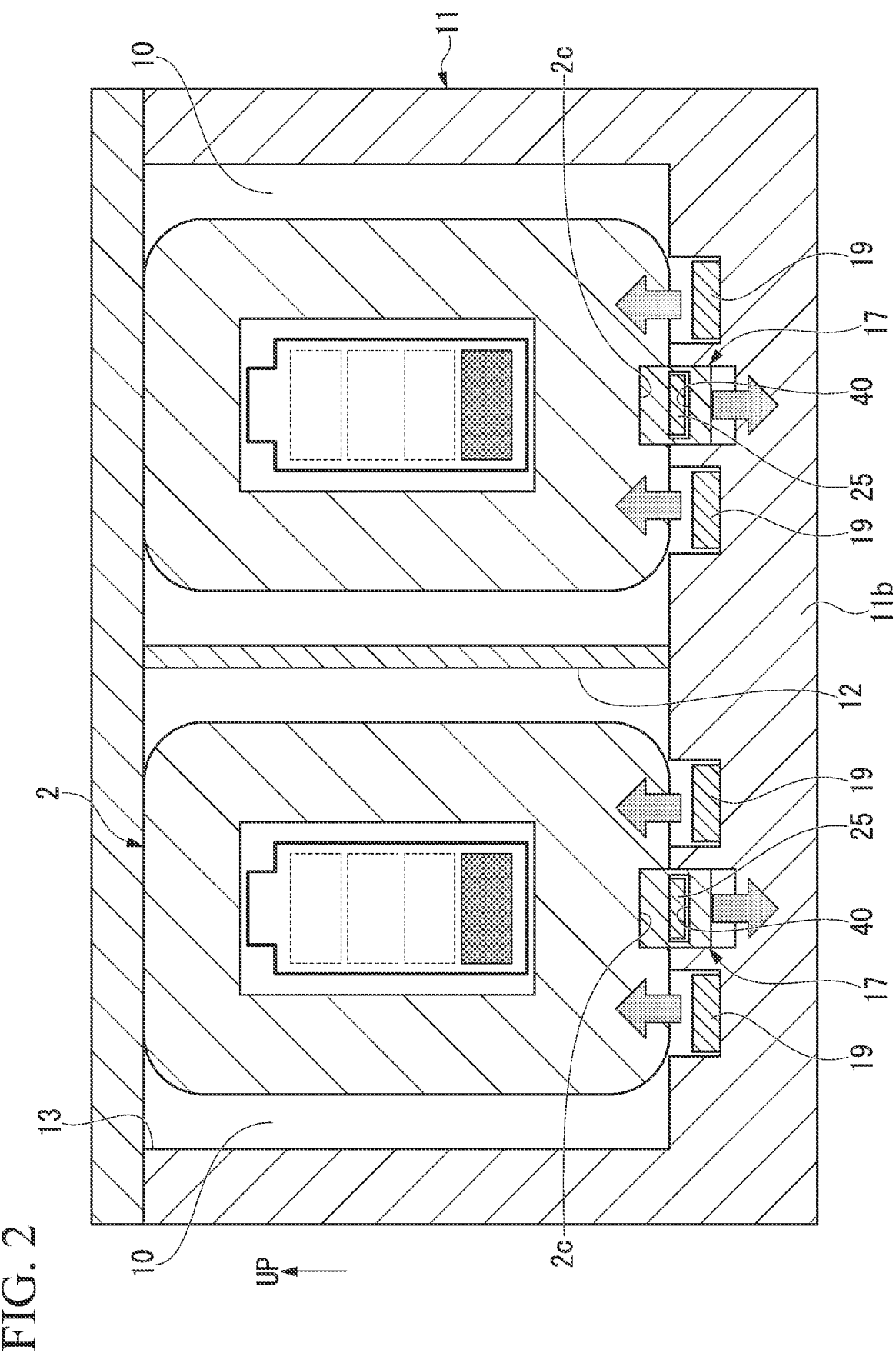
FIG. 2 is a cross-sectional view along line II-II of FIG. 1.
Figure 3:
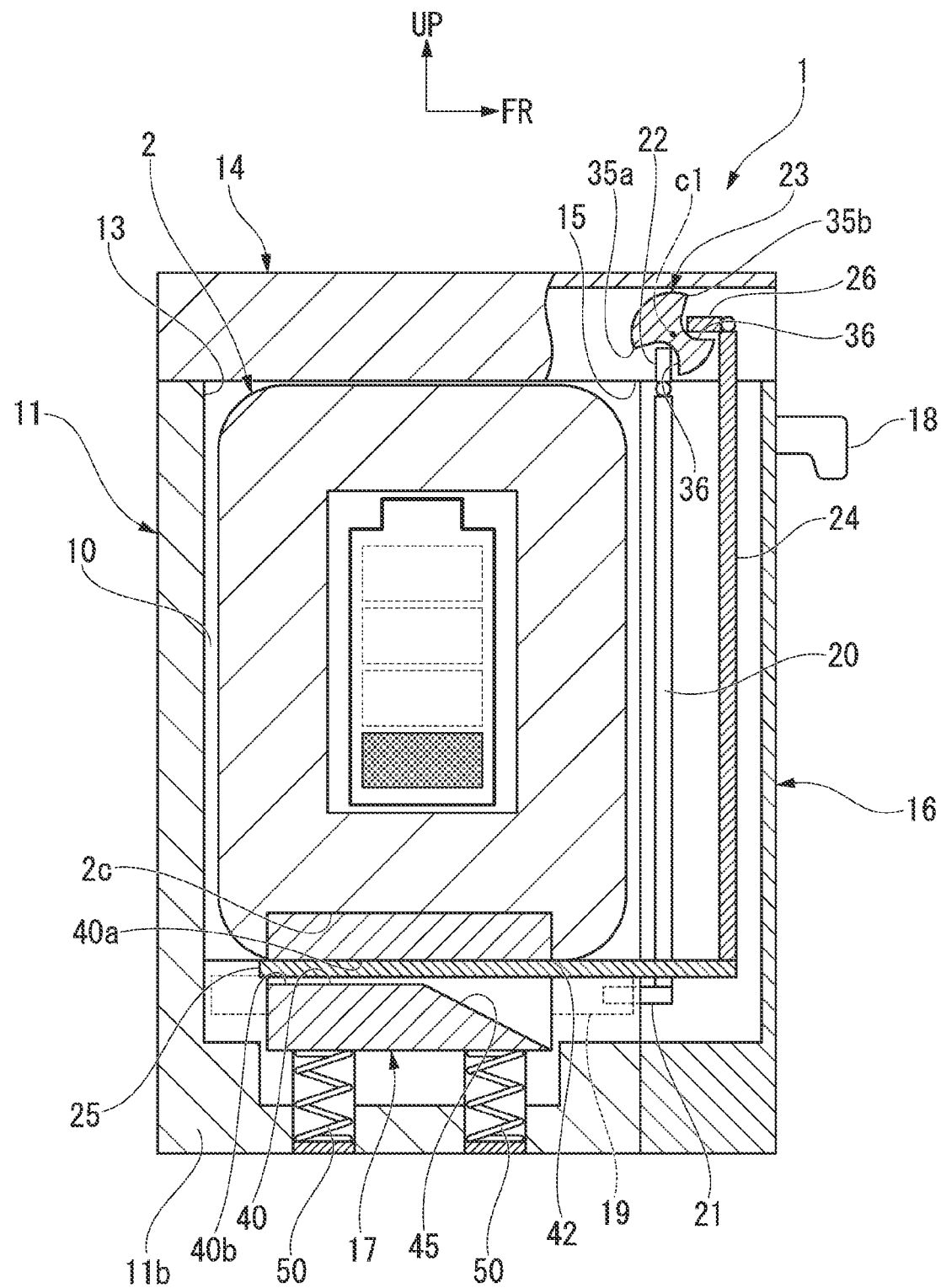
FIG. 3 is a cross-sectional view along line of FIG. 1.

FIG. 1 is a perspective view showing a battery mounting case 1 of an embodiment. FIG. 2 is a cross-sectional view along line II-II of FIG. 1 of the battery mounting case 1, and FIG. 3 is a cross-sectional view along line of FIG. 1 of the battery mounting case 1.

The battery mounting case 1 is installed on a power supply mounting portion of something such as an electric ship, an electric vehicle, or the like. The overall shape of the battery mounting case 1 is a substantially parallelepiped shape that is horizontally elongated, and a plurality of batteries 2 can be mounted therein. In the battery mounting case 1 of the embodiment, two batteries 2 can be installed side by side in a longitudinal direction. However, the number of batteries 2 mounted is not limited to two, and may be one or three or more.

The battery mounting case 1 includes a substantially parallelepiped case main body 11 having two battery storage parts 10. The case main body 11 opens on an upper surface and one horizontally elongated side surface among six surfaces surrounding the outside of the two battery storage parts 10. The inside of the case main body 11 is divided into the two battery storage parts 10 by a partition wall 12.

Hereinafter, for the convenience of description, a side where a side surface opens when seen from an inner side of the case main body 11 is referred to as "front." In addition, the longitudinal direction of the case main body 11 is referred to as "a widthwise direction." In addition, at appropriate places in the drawings, an arrow UP indicates a vertically upward direction and an arrow FR indicates a forward direction.

An opening of the case main body 11 on the side of the upper surface is a battery mounting port 13 that opens toward an upper side of the battery storage parts 10. When the battery 2 is stored in each of the battery storage parts 10, the corresponding battery 2 is inserted in the battery mounting port 13 from above. The battery mounting port 13 can be opened and closed by a lid member 14.

An opening of a side surface of the case main body 11 is a battery extraction port 15 that opens toward a front side of the battery storage part 10. The battery extraction port 15 enables movement of the batteries 2 to the front outside when the batteries 2 are extracted from the battery storage parts 10. The battery extraction port can be opened and closed by a front wall 16 that is movable forward and rearward.

Further, a caster that abuts and rolls on a floor surface of an installation portion of the battery mounting case 1 may be provided at a lower end of the front wall 16.

A pair of connectors 17 electrically connected to the batteries 2 accommodated in the battery storage parts 10 are disposed on a bottom wall 11b of the case main body 11 to be able to move up and down. The connectors 17 are disposed at the bottom portions of each of the two battery storage parts 10. A power cable and a signal cable (not shown) are connected to each of the connectors 17. The power cable and the signal cable are extracted to the outside of the case main body 11 and connected to another instrument that requires power supply. In addition, each of the connectors 17 is disposed in the case main body 11 such that a connecting portion to the batteries 2 is directed vertically upward.

The batteries 2 are chargeable portable batteries, and the outside of the battery main body is covered with a resin. A grip portion (not shown) that can be gripped by a worker is formed on an upper surface side of the battery 2. In addition, a concave connector connecting portion 2c to which the corresponding connector 17 is detachably connected is provided in a substantially central portion of the bottom surface of the battery 2. A plurality of terminals (not shown) that can be connected to a wiring on the side of the connector 17 are disposed on the connector connecting portion 2c. A terminal of the connector connecting portion 2c is connected to an electrode (not shown) of a main body portion of the battery 2 via a control device (not shown).

The lid member 14 is pivotably connected to an upper end portion of the front wall 16 via a pivot hinge (not shown). The pivot hinge has a pivot shaft in a widthwise direction, and the lid member 14 can pivot with the pivot shaft as a pivot point. The lid member 14 is formed in a substantially rectangular shape when seen in a plan view. The lid member 14 is pivoted to a position that is substantially horizontal to close an upper side of the battery mounting port 13 when the front wall 16 is located at an initial position where the battery extraction port 15 is closed. Accordingly, the upper side of the two battery storage parts 10 in the case main body 11 is closed by the lid member 14.

A handle 18 that can be gripped by a worker adheres to the front surface of the front wall 16 in the vicinity of the upper portion. The worker can grip the handle 18 to operate the front wall 16 to slide forward and rearward. In addition, a lock portion (not shown) configured to fix the lid member 14 closing the battery mounting port 13 to the case main body 11 is provided between the lid member 14 and the case main body 11.

Two pairs of rail-shaped members 19 configured to support the batteries 2 on the side of the upper surface protrude from the rear surface of the front wall 16 facing the inside of the battery storage parts 10. Each of the pairs of rail-shaped members 19 is provided to correspond to one of the two battery storage parts 10 in the case main body 11. Each of the rail-shaped members 19 extends substantially horizontally in a forward/rearward direction of the battery mounting case 1. In other words, each of the rail-shaped members 19 extends in a direction in which a battery storage position and a battery extracting position in the battery storage parts 10 are connected. The pairs of rail-shaped members 19 are each separated in the widthwise direction and disposed parallel to each other.

Further, in the embodiment, each of the pairs of rail-shaped members 19 constitutes a temporary placing table that is movable between the battery storage position and the battery extracting position. The batteries 2 can be placed on upper surfaces of each of the pairs of rail-shaped members 19.

One pair of rail-shaped members 19 are located at both positions in the widthwise direction of the one connector 17 in the case main body 11 when seen in a direction along an extension direction of the rail-shaped members 19. Similarly, the other pair of rail-shaped members 19 are located at both positions in a widthwise direction of the other connector 17 in the case main body 11 when seen in the direction along the extension direction of the rail-shaped members 19. In other words, each of the connectors 17 in the case main body 11 is disposed between the corresponding pair of rail-shaped members 19 when seen in the direction along the extension direction of the rail-shaped members 19.

A base end portion of each of the rail-shaped members 19 is supported by a first link plate 20 disposed in the front wall 16. The first link plate 20 is constituted by a metal plate member lengthily extending in the upward/downward direction. A major portion of the first link plate 20 is disposed to be raised and lowered in the front wall 16. A lower end portion of the first link plate 20 is connected to the rail-shaped members 19 via a connecting member 21 extending substantially horizontally on a rear side of the front wall 16. The rail-shaped members 19 are movable integrally with the first link plate 20 in the upward/downward direction.

An upper end portion of the first link plate 20 can protrude upward from the upper surface of the front wall 16. A first engagement plate 22 is pivotably connected to an upper end portion of the first link plate 20. The first engagement plate 22 is engaged with a lever portion 23 pivotably installed inside a front region of the lid member 14 (a region disposed in the pivot hinge). The lever portion 23 is pivotably supported on the upper end portion of the front wall 16. The two first engagement plates 22 connected to the two rail-shaped members 19 that form a pair are arranged in the widthwise direction and engaged with the common lever portion 23. The two lever portions 23 correspond to accommodating regions of the accommodated batteries 2 and are disposed to be separated from each other in the widthwise direction. A specific configuration of the lever portion 23 will be described below.

In addition, a second link plate 24 parallel to the first link plate 20 is disposed in the front wall 16. Like the first link plate 20, the second link plate 24 is constituted by a metal plate member lengthily extending in the upward/downward direction. A major portion of the second link plate 24 is disposed to be raised or lowered in the front wall 16. A connector restricting plate 25 extending substantially horizontally on a rear side of the front wall 16 is connected to the lower end portion of the second link plate 24. The connector restricting plate 25 is constituted by a metal plate member lengthily extending in the forward/rearward direction. The connector restricting plate 25 has a forward/rearward length in which the extension end (rear end portion) substantially reaches the rear end portion of the connector 17 when a width in the widthwise direction is smaller than a width of the connector 17 in the widthwise direction and the front wall 16 is located at an initial position (a position where the battery extraction port 15 is closed).

An upper end portion of the second link plate 24 can protrude upward from the upper surface of the front wall 16. A second engagement plate 26 is pivotably connected to the upper end portion of the second link plate 24. The second engagement plate 26 is engaged with the lever portion 23 installed in the front region of the lid member 14 (the region in which the pivot hinge is disposed). The second engagement plate 26 and the second link plate 24 are disposed between the pair of first engagement plate 22 and the first link plate 20 arranged in the widthwise direction.

The lever portion 23 pivots around a pivoting center c1 in the front region of the lid member 14. The pivoting center c1 is a center of a support shaft (not shown) disposed on an upper side of the front wall 16. The support shaft extends in the widthwise direction. The lever portion 23 pivots in conjunction with an opening/closing operation (pivoting movement) of the lid member 14.

The lever portion 23 includes a pair of engagement pieces 35a and 35b extending in opposite directions about the pivoting center c1. Each of the engagement pieces 35a and 35b has a recessed portion 36 that opens in the radial direction about the pivoting center c1. The one engagement piece 35a is engaged with the first engagement plate 22 in the recessed portion 36. The other engagement piece 35b is engaged with the second engagement plate 26 in the recessed portion 36.

Figure 4:
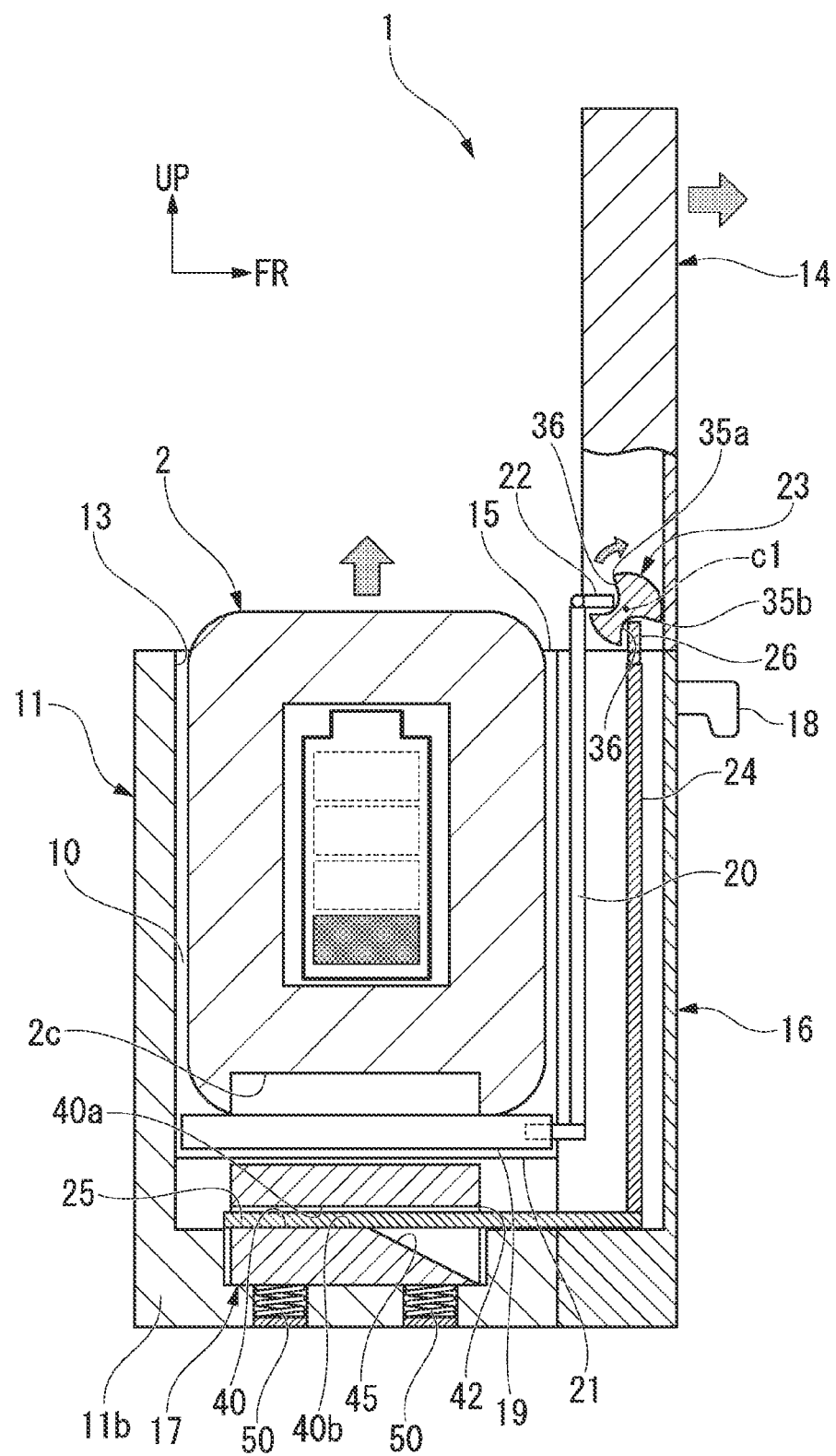
FIG. 4 is a cross-sectional view similar to FIG. 3 showing an operation of the battery mounting case of the embodiment.

FIG. 4 is the same cross-sectional view as FIG. 3 showing a state in which the lid member 14 opens the battery mounting port 13 of the case main body 11. Further, FIG. 3 shows a state in which the lid member 14 closes the battery mounting port 13 of the case main body 11.

When the lever portion 23 is in a state in which the lid member 14 closes the battery mounting port 13, as shown in FIG. 3, the recessed portion 36 of the one engagement piece 35a is directed downward on a rear side of the pivoting center c1, and the recessed portion 36 of the other engagement piece 35b is directed upward on a front side of the pivoting center c1.

Here, the one engagement piece 35a pushes the first engagement plate 22 downward into a substantially vertical attitude, and the other engagement piece 35b pushes the second engagement plate 26 upward into a substantially horizontal attitude. Accordingly, the first link plate 20 is displaced downward in the front wall 16, and the rail-shaped members 19 connected to the lower end of the first link plate 20 are located at drop positions in the battery storage parts 10. When the rail-shaped members 19 are located at the drop positions, the upper surfaces of the rail-shaped members 19 are separated from the lower surfaces of the batteries 2 in the battery storage parts 10 from below (not in contact with the lower surfaces of the batteries 2). In addition, here, the second link plate 24 is displaced upward in the front wall 16, and the connector restricting plate 25 connected to the lower end of the second link plate 24 is located at a rising position.

When the lid member 14 is pivoted in an opening direction as shown in FIG. 4 from this state, the lever portion 23 is in conjunction with the opening operation of the lid member 14 and pivoted in the same direction as the lid member 14. Here, the lever portion 23 is provided such that the recessed portion 36 of the one engagement piece 35a is directed upward on a rear side of the pivoting center c1 and the recessed portion 36 of the other engagement piece 35b is directed downward on a front side of the pivoting center c1.

Accordingly, the one engagement piece 35a pushes the first engagement plate 22 upward in a substantially horizontal attitude, and the other engagement piece 35b pushes the second engagement plate 26 downward in a substantially vertical attitude. Here, the first link plate 20 is displaced upward in the front wall 16, and the rail-shaped members 19 are moved to the rising position in the battery storage parts 10. The rail-shaped members 19 abut the lower surfaces of the batteries 2 in the middle of movement to the rising position, and slightly raise the batteries 2 upward from the bottom portions of the battery storage parts 10. In addition, here, the second link plate 24 is displaced downward in the front wall 16, and the connector restricting plate 25 moves to a drop position.

The connectors 17 are biased vertically upward by a pair of coil springs 50 that are upward biasing portions below the battery storage parts 10. Each of the coil springs 50 is disposed on the bottom wall 11b of the case main body 11, and the upper surface abuts the lower surface of the connector 17. In addition, an insertion hole 40 passing in the forward/rearward direction is formed in the connector 17.

The connector restricting plate 25 connected to the lower end of the second link plate 24 can be inserted into the insertion hole 40. The connector restricting plate 25 restricts upward and downward displacement of the connector 17 while being inserted into the insertion hole 40. The connector restricting plate 25 is located on an outer side of the insertion hole 40 (an outer side of the connector 17) in a state in which the front wall 16 is moved to the battery extracting position (see FIG. 5). Here, displacement restriction of the connector 17 by the connector restricting plate 25 in the upward/downward direction is released. In addition, the connector restricting plate 25 is located in the insertion hole 40 when the front wall 16 is moved from the battery extracting position toward the battery accommodating position.

As shown in FIG. 2, the insertion hole 40 of the connector 17 has a hole with a substantially rectangular cross section. As shown in FIG. 3 and FIG. 4, a lower surface 40a of an upper wall of the insertion hole 40 is constituted by a flat surface that substantially horizontally connect the front end position and the rear end portion. Meanwhile, an upper surface 40b of the lower wall of the insertion hole 40 is constituted by a substantially horizontal flat surface from the rear end portion to a predetermined position on the front side, and the front side of the predetermined position is constituted by an inclined surface 45 inclined downward toward the front side.

The connector restricting plate 25 is inserted into the insertion hole 40 of the connector 17, and restricts downward displacement of the connector 17 by abutting the lower surface 40a of the upper wall of the insertion hole 40. In addition, the connector restricting plate 25 is inserted into the insertion hole 40 of the connector 17, and restricts upward displacement of the connector 17 by abutting the upper surface 40b of the lower wall of the insertion hole 40. In the embodiment, the connector restricting plate 25 constitutes a displacement restricting portion configured to restrict upward displacement of the connector 17 in a state in which the lid member 14 opens (a state in which an operation part is operated).

Further, the connector restricting plate 25 abuts the upper surface 40b of the lower wall of the insertion hole 40 and restricts excessive upward displacement of the connectors 17 by the coil springs 50 in a state in which the batteries 2 are not stored in the battery storage parts 10. In addition, the connector restricting plate 25 abuts the lower surface 40a of the upper wall of the insertion hole 40 and restricts excessive downward displacement of the connectors 17 due to the weight of the batteries 2 in a state in which the batteries 2 are stored in the battery storage parts 10.

The connector restricting plate 25 is located at the rising position together with the second link plate 24 in a state in which the lid member 14 is closed as described above (see FIG. 3). Here, the connectors 17, positions of which are restricted by the connector restricting plate 25, are located at positions to which the connector connecting portions 2c of the batteries 2 can be connected. In the embodiment, the height positions of the connectors 17 are connecting positions to which the batteries 2 can be connected.

In addition, the connector restricting plate 25 is located at a drop position together with the second link plate 24 in a state in which the lid member 14 opens as described above (see FIG. 4). Here, the connectors 17, positions of which are restricted by the connector restricting plate 25, are located at positions where they are separated downward from the connector connecting portions 2c of the batteries 2. In the embodiment, the height positions of the connectors 17 are detachment position where the connectors 17 are separated from the connector connecting portions 2c of the batteries 2.

In the embodiment, the first link plate 20 and the first engagement plate 22 constitute a connector-side link mechanism configured to move the connectors 17 to the detachment positions according to pivoting of the lever portion 23 in one direction. In addition, the second link plate 24 and the second engagement plate 26 constitute a temporary placing table-side link mechanism configured to move the pair of rail-shaped members 19 (temporary placing table) to positions, where the batteries 2 can be supported, according to pivoting of the lever portion 23 in one direction.

Further, in the embodiment, the connector-side link mechanism (the first link plate 20, first engagement plate) and the temporary placing table-side link mechanism (the second link plate 24, the second engagement plate 26), which are above-mentioned, constitute an interlocking mechanism together with the lever portion 23. The interlocking mechanism is in conjunction with an operation (opening operation) of the operation part (the lid member 14) in one direction to move the connectors 17 to the detachment positions, and move the pair of rail-shaped members 19 (temporary placing table) to positions where the batteries 2 can be supported (see FIG. 4). In the embodiment, the lid member 14 that is an operation part and the above-mentioned interlocking mechanism constitute an exchange preparation mechanism. The exchange preparation mechanism moves the connectors 17 to the detachment position and moves the pair of rail-shaped members 19 (temporary placing table) to a position where the batteries 2 can be supported, before moving the pair of rail-shaped members 19 (temporary placing table) from the battery storage position to the battery extracting position.

Figure 5:
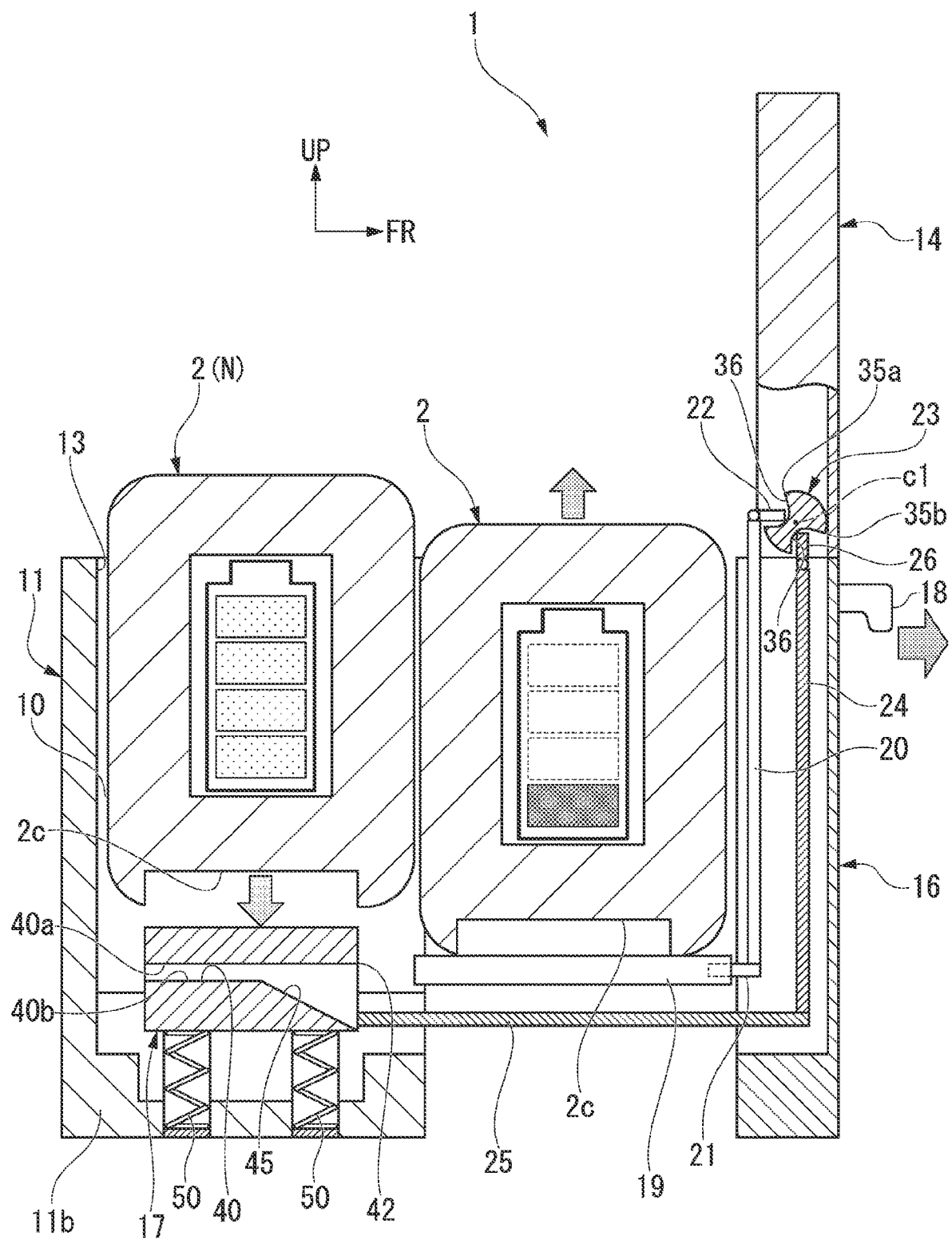
FIG. 5 is a cross-sectional view similar to FIG. 3 showing another operation of the battery mounting case of the embodiment.
Figure 6:
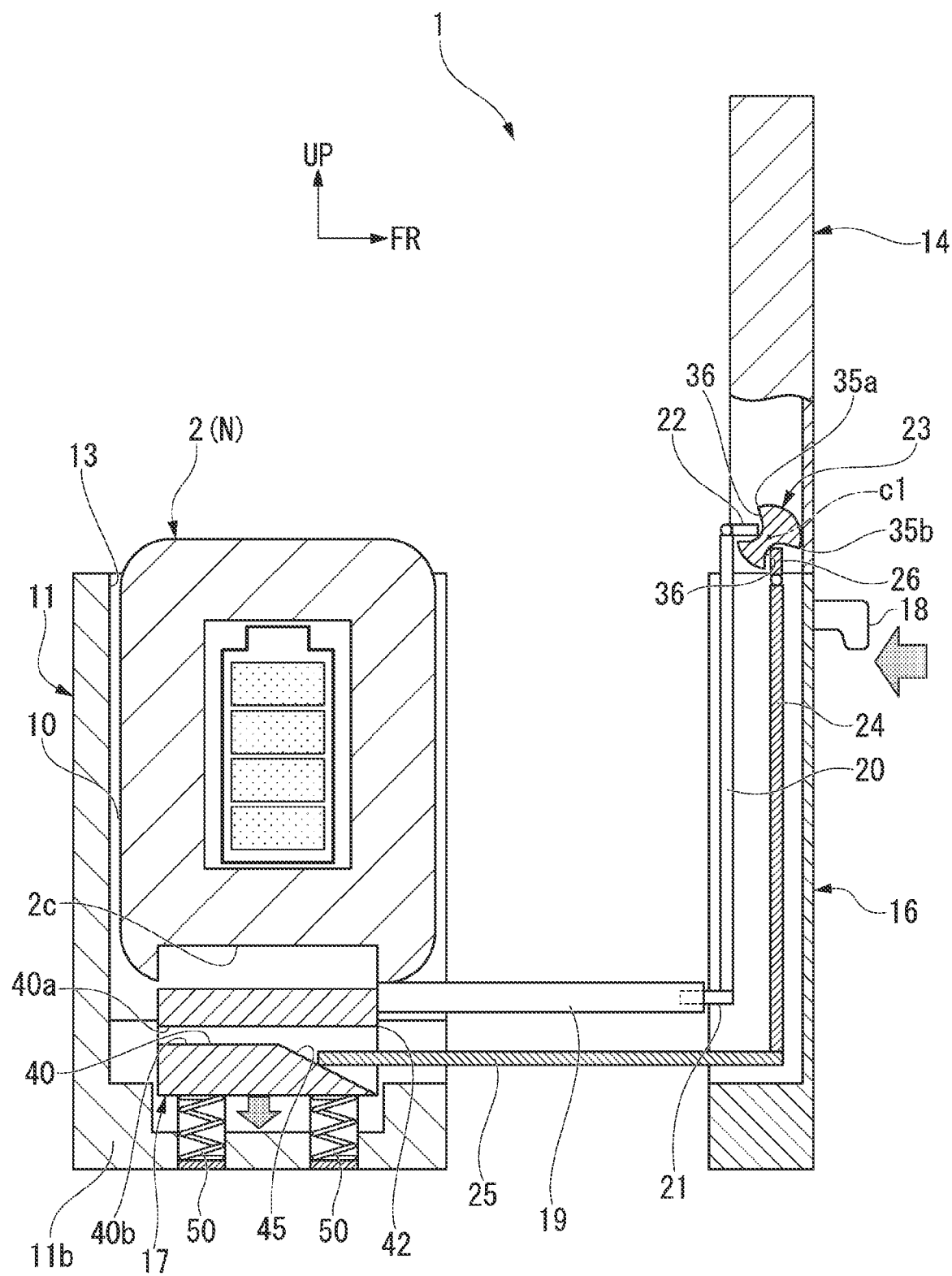
FIG. 6 is a cross-sectional view similar to FIG. 3 showing still another operation of the battery mounting case of the embodiment.

FIG. 5 is the same cross-sectional view as FIG. 3 showing an operation when the front wall 16 is extracted forward to exchange the batteries 2. FIG. 6 is the same cross-sectional view as FIG. 3 showing an operation when the front wall 16 is closed after the used batteries 2 are extracted.

When the used batteries 2 are exchanged with the charged batteries 2(N), for example, a worker grips the handle 18 to move the front wall 16 forward from a state shown in FIG. 4 (a state in which the connectors 17 are separated from the batteries 2 and the pair of rail-shaped members 19 support the batteries 2). Accordingly, the batteries 2 supported by the pair of rail-shaped members 19 are moved forward together with the front wall 16.

Here, when the front wall 16 moves to the battery extracting position shown in FIG. 5, the connector restricting plate 25 extending rearward from the front wall 16 comes off forward from end portions of the connectors 17 on a front side of the insertion hole 40, and displacement restriction of the connectors 17 by the connector restricting plate 25 is released. As a result, the connectors 17 become free and protrude upward due to the biasing force of the coil springs 50. Here, spaces in which other batteries 2 can be stored are secured in the battery storage parts 10 of the case main body 11.

Further, in the embodiment, a portion of the connector 17 deviated forward from the end portion of the insertion hole 40 on the front side (a portion not in contact with the connector restricting plate 25 on the front end side of the insertion hole 40) constitutes a restriction release portion 42.

Next, as shown by a downward arrow in FIG. 5, the charged batteries 2(N) is inserted into new spaces created in the battery storage parts 10 through the battery mounting port 13. In this way, when the charged batteries 2(N) are inserted into the battery storage parts 10, the batteries 2(N) are fitted to the connectors 17 and placed on upper portions of the connectors 17. Here, loads of the batteries 2(N) are applied to the connectors 17, and the connectors 17 sink slightly against the biasing force of the coil springs 50. The charged batteries 2(N) are held by the connectors 17 and the coil springs 50 at this time.

After that, a worker extracts the used batteries 2 on the pair of rail-shaped members 19 at the battery extracting position. Here, for example, the worker grabs upper grip portions of the batteries 2 and lifts them.

After that, the worker pushes the front wall 16 in an initial position direction on the rear side as shown by a leftward arrow in FIG. 6. Here, a tip portion of the connector restricting plate 25 protruding rearward from the front wall 16 abuts the inclined surface 45 of the connector 17 on the front side of the insertion hole 40, and pushes the connector 17 downward as shown by a downward arrow in FIG. 6 using a cam action by the inclined surface 45. The connector restricting plate 25 is inserted into a region of the insertion hole 40 with no inclined surface 45 when the tip portion exceeds an apex of the inclined surface 45. During this time, the pair of rail-shaped members 19 are inserted into the lower surfaces of the batteries 2(N) at both side positions of the connectors 17 and support the batteries 2(N) from below.

Further, in the embodiment, the inclined surface 45 of the insertion hole 40 constitutes a restart function part configured to restart displacement restriction of the connectors 17 by the connector restricting plate 25 again after the displacement restriction of the connectors 17 by the connector restricting plate 25 is released by the restriction release portion 42.

As described above, when the front wall 16 returns to the initial position shown in FIG. 3, the lid member 14 is operated in a closing direction after that. When the lid member 14 is operated in the closing direction in this way, the lever portion 23 is in conjunction with the lid member 14 to pivot the lid member 14 in the same direction. Here, the first engagement plate 22 is pushed downward in a substantially vertical attitude, and the pair of rail-shaped members 19 move to the drop position together with the first link plate 20. As a result, the pair of rail-shaped members 19 are separated from below the batteries 2(N). In addition, here, the second engagement plate 26 is pushed upward in a substantially horizontal attitude, and the second link plate 24 moves to the rising position together with the connector restricting plate 25. As a result, the connectors 17 are conductively connected to the batteries 2(N) at the connector connecting position.

<Effects of Embodiment>

The battery mounting case 1 of the embodiment includes the temporary placing table (the pair of rail-shaped members 19) movable between the battery storage position and the battery extracting position, and the exchange preparation mechanism. The exchange preparation mechanism moves the connectors 17 to the detachment position and moves the temporary placing table to the position where support of the batteries 2 is possible, before moving the temporary placing table from the battery storage position to the battery extracting position. For this reason, upon exchange of the batteries 2, the connectors 17 can be moved to the detachment position by the exchange preparation mechanism, and the temporary placing table can be moved to a position where the batteries 2 can be supported. In the battery mounting case 1 of the embodiment, the charged batteries 2(N) are stored in the battery storage parts 10 through the battery mounting port 13 by moving the temporary placing table to the battery extracting position from this state, and then, the used batteries 2 can be extracted from the temporary placing table.

Accordingly, when the battery mounting case 1 of the embodiment is employed, the exchange work of the batteries 2 can be performed without temporarily placing the used batteries 2 or the charged batteries 2(N) on the nearby floor surface or the like.

In addition, in the battery mounting case 1 of the embodiment, the exchange preparation mechanism includes the operation part (the lid member 14) operated by a worker, and the interlocking mechanism in conjunction with an operation of the operation part in one direction to move the connectors 17 to the detachment position and move the temporary placing table (the pair of rail-shaped members 19) to the battery support position. For this reason, the connectors 17 can be moved to the detachment position in conjunction with the operation of the operation part in the one direction by the worker, and the temporary placing table can be moved to the battery support position.

Accordingly, when the configuration is employed, the exchange preparation of the batteries 2 can be completed by a simple operation by the worker.

In addition, the battery mounting case 1 of the embodiment includes the upward biasing portion (the coil springs 50) configured to bias the connectors 17 upward, the displacement restricting portion (the connector restricting plate 25) configured to restrict upward displacement of the connectors 17, and the restriction release portion 42 configured to release displacement restriction of the connectors 17 by the displacement restricting portion. Then, the restriction release portion 42 releases displacement restriction of the connectors 17 by the displacement restricting portion when the temporary placing table (the pair of rail-shaped members 19) is moved from the battery storage position to the battery extracting position in a state in which the operation part (the lid member 14) is operated by the worker in one direction.

For this reason, upon exchange of the batteries 2, in a state in which the operation part (the lid member 14) is operated in one direction, when the temporary placing table on which the used batteries 2(N) are placed is moved from the battery storage position to the battery extracting position, displacement restriction of the connectors 17 is released by the restriction release portion 42. As a result, the connectors 17 can be biased by the upward biasing portion and protrude upward, and the charged batteries 2(N) stored in the battery storage parts 10 can be held at a predetermined height by a biasing force due to the upward biasing portion. Accordingly, when the temporary placing table is operated to move from the battery extracting position to the battery storage position after that, the temporary placing table can be smoothly inserted under the charged batteries 2(N).

Accordingly, when the configuration is employed, the temporary placing table can be smoothly returned to the position below the batteries 2(N) after the charged batteries 2(N) are disposed in the battery storage parts 10.

Further, in the battery mounting case 1 of the embodiment, when the temporary placing table (the pair of rail-shaped members 19) are moved from the battery extracting position toward the battery storage position, the restart function part (the inclined surface 45) restarts displacement restriction of the connectors 17 by the displacement restricting portion (the connector restricting plate 25). For this reason, when the temporary placing table is operated to move from the battery extracting position toward the battery storage position, displacement restriction of the connectors 17 by the displacement restricting portion is restarted in a state in which the temporary placing table is inserted below the charged batteries 2(N). For this reason, when the temporary placing table is returned to the battery storage position from the battery extracting position, constant attitudes or positions of the connectors 17 and the batteries 2(N) supported by the connectors 17 can be maintained.

In addition, in the battery mounting case 1 of the embodiment, when the operation part (the lid member 14) is operated in the other direction after the restriction release portion 42 restarts displacement restriction of the connectors 17 by the displacement restricting portion (the connector restricting plate 25), the interlocking mechanism moves the connectors 17 to the connecting position and moves the temporary placing table to a position where the temporary placing table (the pair of rail-shaped members 19) is separated from the batteries 2(N). Accordingly, when the configuration is employed, connection of the connectors 17 to the batteries 2(N) and returning of the temporary placing table to the initial position can be completed by the operation of the operation part in the other direction.

In addition, in the battery mounting case 1 of the embodiment, the operation part is constituted by the lid member 14, and movement of the connectors 17 to the detachment position and movement of the temporary placing table (the pair of rail-shaped members 19) to the battery support position are executed in conjunction with the opening operation of the lid member 14. Accordingly, when the configuration is employed, since there is no need to operate a dedicated operation part separately from the opening operation of the lid member 14, an exchange work of the batteries 2 can be efficiently performed.

Further, in the battery mounting case 1 of the embodiment, the temporary placing table is constituted by the pair of rail-shaped members 19 extending in the forward/rearward direction, and the pair of rail-shaped members 19 are disposed while being separated in the widthwise direction. Then, the connectors 17 are disposed between the pair of rail-shaped members 19 when seen in the forward/rearward direction. For this reason, when the configuration is employed, the pair of rail-shaped members 19 and the connectors 17, which are the temporary placing table, can be disposed compactly in the space limited in the battery storage parts 10. Further, when the configuration is employed, the batteries 2 can be supported with good balance by the pair of rail-shaped members 19 on both sides with the connector connecting portion 2c sandwiched therebetween.

In addition, in the battery mounting case 1 of the embodiment, the interlocking mechanism includes the lever portion 23, the connector-side link mechanism (the first link plate 20 and the first engagement plate 22), and the temporary placing table-side link mechanism (the second link plate 24 and the second engagement plate 26). Then, the lever portion 23 has the pair of engagement pieces 35a and 35b extending in opposite directions about the pivoting center c1, and pivots in conjunction with the operation part (the lid member 14). The connector-side link mechanism is linked to the one engagement piece 35a to move the connectors 17 to the detachment position according to pivoting of the lever portion 23 in one direction, and the temporary placing table-side link mechanism is linked to the other engagement piece 35b to move the temporary placing table to the support position of the batteries 2 according to pivoting of the lever portion 23 in one direction.

For this reason, the connectors 17 and the temporary placing table (the pair of rail-shaped members 19) can be operated vertically in opposite directions in conjunction with the pivoting operation of the lever portion 23 by the connector-side link mechanism and the temporary placing table-side link mechanism. Accordingly, when the configuration is employed, the operation of the connectors 17 to the detachment position and the moving operation of the temporary placing table to the battery support position can be smoothly performed while providing the simple configuration.

Further, the present invention is not limited to the above-mentioned embodiment and various design changes may be made without departing from the scope of the present invention.

For example, while the temporary placing table movable between the battery storage position and the battery extracting position is constituted by the pair of rail-shaped members 19 in the above-mentioned embodiment, the temporary placing table is not limited to the rail-shaped member. The temporary placing table may be of any other structure as long as the batteries 2 can be supported when moved.

In addition, while each of the connector-side link mechanism and the temporary placing table-side link mechanism is constituted by the first link plate 20, the first engagement plate 22, the second link plate 24, and the second engagement plate 26 in the above-mentioned embodiment, the components that constitute these link mechanisms do not necessarily have to be plate members. They can also be constituted by, for example, rod-shaped members.

Further, while the link mechanism is employed as the interlocking mechanism configured to move the connectors to the detachment position in conjunction with the operation of the operation part in one direction and move the temporary placing table to the battery support position in the above-mentioned embodiment, the interlocking mechanism is not limited to the link mechanism. The interlocking mechanism can also employ another mechanical mechanism such as a cam mechanism, a gear mechanism, or the like.

In addition, while the exchange preparation mechanism is constituted by the operation part and the mechanical interlocking mechanism (link mechanism) in the above-mentioned embodiment, the exchange preparation mechanism is not limited to the configuration. For example, the exchange preparation mechanism may include a switch operated by a worker, and an actuator configured to move a connector and a temporary placing table in response with an operation of the switch.

DESCRIPTION OF REFERENCE NUMERALS

1 Battery mounting case
2 Battery
10 Battery storage part
11 Case main body
13 Battery mounting port
14 Lid member (operation part)
17 Connector
19 Rail-shaped member (temporary placing table)
20 First link plate (interlocking mechanism, temporary placing table-side link mechanism, exchange preparation mechanism)
22 First engagement plate (interlocking mechanism, temporary placing table-side link mechanism, exchange preparation mechanism)
23 Lever portion (interlocking mechanism, exchange preparation mechanism)
24 Second link plate (interlocking mechanism, connector-side link mechanism, exchange preparation mechanism)
26 Second engagement plate (interlocking mechanism, connector-side link mechanism, exchange preparation mechanism)
35a, 35b Engagement pieces
40 Insertion hole (displacement restricting portion)
42 Restriction release portion
45 Inclined surface (restart function part)
50 Coil spring (upward biasing portion)
c1 Pivoting center

What is claimed is:

1. A battery mounting case comprising:
a case main body having a battery storage part that stores a battery and a battery mounting port that opens to an upper side of the battery storage part;
a connector that is conductively connected to the battery stored in the case main body;
a temporary placing table that is movable between a battery storage position in the battery storage part and a battery extracting position outside the battery storage part; and
an exchange preparation mechanism that moves the connector to a detachment position where the connector is separated from the battery and moves the temporary placing table to a position where the battery is able to be supported before moving the temporary placing table from the battery storage position to the battery extracting position.

2. The battery mounting case according to claim 1, wherein the exchange preparation mechanism comprises:

an operation part that is operated by a worker; and an interlocking mechanism that moves the connector to the detachment position and moves the temporary placing table to a position where the battery is able to be supported in conjunction with an operation of the operation part in one direction.

3. The battery mounting case according to claim 2, further comprising:

an upward biasing portion that biases the connector upward;

a displacement restricting portion that restricts upward displacement of the connector; and a restriction release portion that releases displacement restriction of the connector by the displacement restricting portion when the temporary placing table is moved from the battery storage position to the battery extracting position.

4. The battery mounting case according to claim 3, further comprising:

a restart function part that restarts displacement restriction of the connector by the displacement restricting portion when the temporary placing table is moved from the battery extracting position toward the battery storage position.

5. The battery mounting case according to claim 4, wherein the interlocking mechanism moves the connector to a connecting position to the battery and moves the temporary placing table to a position where the table is separated from the battery in conjunction with the operation of the operation part in another direction when the operation part is operated in the other direction after the restriction release portion restarts displacement restriction of the connector by the displacement restricting portion.

6. The battery mounting case according to claim 2, wherein the operation part is constituted of a lid member that opens and closes the battery mounting port, and the one direction is a direction in which the lid member opens.

7. The battery mounting case according to claim 1, wherein the temporary placing table is constituted of a pair of rail-shaped members that extend in a direction in which the battery storage position and the battery extracting position are connected, the pair of rail-shaped members are disposed to be separated in a direction crossing the extension direction of the rail-shaped members, and the connector is disposed between the pair of rail-shaped members when seen in a direction along the extension direction of the rail-shaped members.

8. The battery mounting case according to claim 2, wherein the temporary placing table is constituted of a pair of rail-shaped members that extend in a direction in which the battery storage position and the battery extracting position are connected, the pair of rail-shaped members are disposed to be separated in a direction crossing the extension direction of the rail-shaped members, and the connector is disposed between the pair of rail-shaped members when seen in a direction along the extension direction of the rail-shaped members.

9. The battery mounting case according to claim 2, wherein the interlocking mechanism comprises:

a lever portion that has a pair of engagement pieces extending in an opposite direction from a pivoting center and pivots in conjunction with the operation part;

a connector-side link mechanism that is linked to one of the engagement pieces and moves the connector to the detachment position by pivoting of the lever portion in one direction; and a temporary placing-table-side link mechanism that is linked to another of the engagement pieces and moves the temporary placing table to a position where the battery is able to be supported by pivoting of the lever portion in one direction.

10. The battery mounting case according to claim 5, wherein the interlocking mechanism comprises:

a lever portion that has a pair of engagement pieces extending in an opposite direction from a pivoting center and pivots in conjunction with the operation part;

a connector-side link mechanism that is linked to one of the engagement pieces and moves the connector to the detachment position by pivoting of the lever portion in one direction; and a temporary placing-table-side link mechanism that is linked to another of the engagement pieces and moves the temporary placing table to a position where the battery is able to be supported by pivoting of the lever portion in one direction.

* * * * *